United States Patent [19]

Kelly

[11] Patent Number: 5,706,139
[45] Date of Patent: Jan. 6, 1998

[54] HIGH FIDELITY OPTICAL SYSTEM FOR ELECTRONIC IMAGING

[76] Inventor: Shawn L. Kelly, 8479 Pine Cove Dr., Commerce Township, Mich. 48382

[21] Appl. No.: 544,186

[22] Filed: Oct. 17, 1995

[51] Int. Cl.⁶ ................................................. G02B 3/00
[52] U.S. Cl. ...................... 359/737; 359/565; 359/709
[58] Field of Search ............................ 359/559, 565, 359/654, 708, 709, 737, 742, 837

[56] References Cited

U.S. PATENT DOCUMENTS

| 3,781,091 | 12/1973 | Ferguson et al. | 350/167 |
|---|---|---|---|
| 4,477,148 | 10/1984 | Tsuji et al. | 350/286 |
| 4,733,943 | 3/1988 | Suzuki et al. | 350/162.16 |
| 4,843,494 | 6/1989 | Cronin et al. | 360/77.03 |
| 4,900,138 | 2/1990 | Atkinson, III et al. | 359/654 |
| 5,005,968 | 4/1991 | Tejima et al. | 353/122 |
| 5,142,413 | 8/1992 | Kelly | 359/559 |
| 5,178,636 | 1/1993 | Silberman | 623/6 |
| 5,182,672 | 1/1993 | Mukai et al. | 359/652 |
| 5,218,471 | 6/1993 | Swanson et al. | 359/565 |
| 5,227,915 | 7/1993 | Grossinger et al. | 359/565 |
| 5,257,132 | 10/1993 | Ceglio et al. | 359/565 |
| 5,260,828 | 11/1993 | Londono et al. | 359/565 |
| 5,322,998 | 6/1994 | Jackson | 250/216 |
| 5,337,181 | 8/1994 | Kelly | 359/574 |
| 5,386,319 | 1/1995 | Whitney et al. | 359/575 |
| 5,438,366 | 8/1995 | Jackson | 348/342 |

FOREIGN PATENT DOCUMENTS

| 55-38549 | 3/1980 | Japan | 359/837 |
|---|---|---|---|
| 62-38417 | 2/1987 | Japan | 359/709 |

Primary Examiner—Paul M. Dzierzynski
Assistant Examiner—Darren E. Schuberg
Attorney, Agent, or Firm—Lyon, P.C.

[57] ABSTRACT

An optical subsystem (14) for use in an electronic imaging system (10) utilizes a spatial filter (20) having a concentric optical path profile for removing unwanted structures in the optically formed image. In a first embodiment, the filter (20) includes an axisymmetric conical surface (24) formed on an optical substrate (22) to provide a light path modifying profile designed to achieve a desired circular point spread function in an image plane (16). Other embodiments include an elliptical/conical profile, and an axisymmetric, concentric ring profile. The filter profile may be single-point diamond turned into a flat filter substrate, or can be combined/integrated with the profile of an existing optical system element, such as lens (18). The present invention further provides a method for removing unwanted artificial image structures by generating an imaging system point spread function which is a hollow, closed path.

17 Claims, 2 Drawing Sheets

HIGH FIDELITY OPTICAL SYSTEM FOR ELECTRONIC IMAGING

BACKGROUND OF THE INVENTION

The present invention relates generally to optical imaging systems, and more particularly to an optical subsystem capable of removing or altering artificial structures in an optically formed image.

Modern imaging systems such as electronic cameras and electronic display projectors suffer due to the artificial and discrete nature of the picture elements comprising the image. Transparent spatial filtering is one common approach to increasing the fidelity of these images. In electronic cameras, moiré patterns, false color signals and other artifacts of aliasing may be reduced by suppressing spatial frequencies in the optically formed image which are greater than the maximum spatial frequency supported by the detector. In electronic image projection systems, spatial frequencies associated with pixel and line structures in the electronic image may be reduced to produce a more realistic result. Further, in projection systems employing a Fresnel projection screen, the reduction of these structures also leads directly to a reduction in distracting moiré patterns in the image.

While these solutions have been understood for decades, the actual use of spatial filtering is limited due to the difficulty of fabrication and marginal performance of known transparent spatial filter elements. Such filters operate fundamentally by applying a unidirectional optical path difference profile across an aperture of a camera or projector lens system. Such a profile commonly consists of a striped prism, repeated facet or even a repeated lenticular surface structure. Because of the unidirectional nature of these structures, fabrication is usually performed by a linear ruling engine with either a single-point or bladed cutting tool. However, because these tooling machines are difficult to precisely control, variations in the structures are common and fabrication often leaves a microroughness as well as visible ridges in the filter. These artifacts produce a flaring of the light in the image perpendicular to the linear direction of the filter structure. Thus while the purpose of the filter may be to slightly spread the point spread function of the imaging system, the contrast of the overall image degrades due to this flaring.

Yet another problem with the unidirectional structure is that it must be applied to a flat surface to accommodate the manufacturing process. Thus, the filtering structures can not be applied to the curved surfaces of the optical elements of an existing design. Such a filter therefore represents an additional optical element which results in additional cost and decreased image brightness.

Further, most electronically produced images are two dimensional and exhibit undesirable two dimensional image artifacts. Accordingly, application of known transparent spatial filters requires a crossing of two unidirectional structures. The flaring of the imaging system's point spread function therefore becomes two dimensional from the cumulative scattering of the two structures, creating a star pattern and further decreasing contrast in the image.

Furthermore, because of the crossed orientation of filter structures required for most electronic imaging systems, the filter's performance is sensitive to rotation, creating difficulty in applying a conventional filter in a rotating focus or zoom lens configuration.

Finally, conventional filter structures produce a point spread function consisting of two or more shifted points which are convolved with the point spread function of the optical subsystem in which the filter is integrated. Consequently, the filtering is strong in the discrete direction of the shifts and weaker in other directions. The strong filtering is therefore typically excessive to compensate for the weaker filtering in other directions, resulting in a compromise between excessive blur and inadequate filtering in the overall image.

SUMMARY OF THE INVENTION

It is therefore an object of the present invention to provide an optical subsystem for an electronic imaging system which produces images of higher fidelity and contrast than those produced by conventional, spatially filtered imaging systems.

It is another object of the present invention to provide a method of removing unwanted artificial structures in an optically formed image by generating a hollow, closed path imaging system point spread function.

It is another object of the present invention to provide an optical subsystem for an electronic imaging system employing an optical spatial filter which is easily fabricated with minimized manufacturing defects.

It is another object of the present invention to provide an improved optical spatial filter which is both easier to manufacture and provides better filter performance than conventional spatial filters.

It is another object of the present invention to provide an optical subsystem for an electronic imaging system employing an optical spatial filter which also serves as a conventional lens.

It is another object of the present invention to provide an optical subsystem for an electronic imaging system employing an optical spatial filter which performs independent of rotational orientation.

It is another object of the present invention to provide an optical subsystem for an electronic imaging system employing an improved optical spatial filter which produces greater control of the reduction of image structures than conventional spatial filters.

In accordance with a first aspect of the present invention, an optical system for an electronic imaging system is described comprising an optical spatial filter for modifying or removing unwanted structures in the image, wherein the filter comprises a single transparent or reflective concentric surface structure which provides a hollow, closed-path point spread function. In a first embodiment, the hollow, closed path is a circular point spread function generated by an axiconical filter surface profile. The axiconical filter provides rotational independence, and is located within the imaging system such that light from every point in the object plane passes symmetrically through the center of the filter. In a second embodiment, the present invention can produce an elliptical point spread function, and in a third embodiment the filter comprises a plurality of axisymmetric concentric ring structures on the filter surface which generates a circular point spread function to modify or remove the unwanted image structures. The filter structure may be single-point diamond turned into a flat optical substrate or mold, or may alternatively be designed and fabricated into the surface of an existing lens element of the optical subsystem design.

In accordance with a second aspect of the present invention, a method for removing unwanted artificial structures in an optically formed image comprises the steps of generating an imaging system point spread function which comprises a hollow, closed path, and modifying the optically formed image with the imaging system point spread function. In one embodiment, the hollow, closed path is circular, and in another embodiment the hollow, closed path is elliptical.

The present invention will be more fully understood upon reading the following detailed description of a preferred embodiment in conjunction with the accompanying drawings.

DETAILED DESCRIPTION OF THE PREFERRED EMBODIMENT(S)

Figure 1:
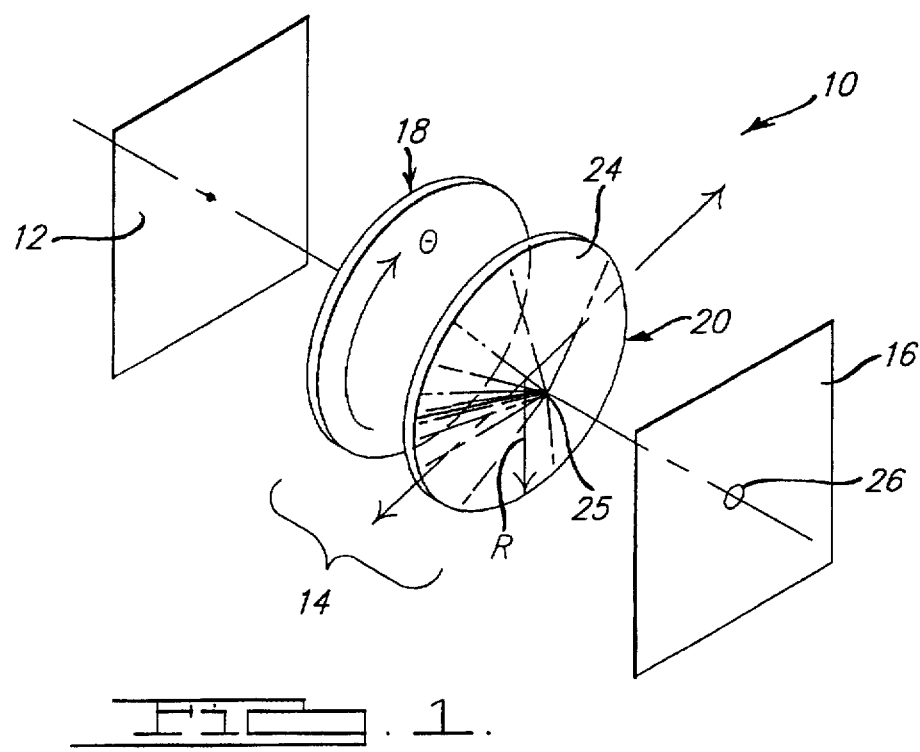
FIG. 1 is a diagrammatic illustration of an imaging system including an optical subsystem having a first conical spatial filter embodiment in accordance with the present invention.
Figure 4:
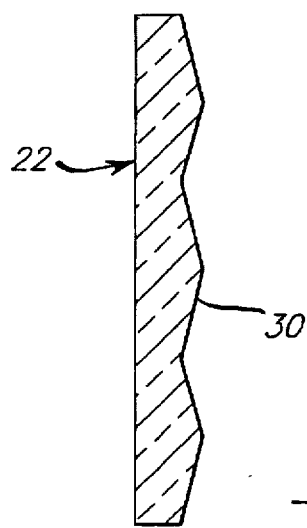
FIG. 4 is a cross-sectional view taken perpendicular to the base of an axisymmetrical, concentric ring embodiment of the present invention.

FIG. 1 illustrates a representative configuration of an imaging system 10 comprising an object plane 12, an optical subsystem 14 and an image plane 16. The object plane 12 or the image plane 16 may be either close to or far from the optical subsystem 14, as may be appropriate for a given application. The optical subsystem 14 comprises a lens 18 and a spatial filter 20. One of ordinary skill in the art will readily appreciate that the lens 18 can be implemented to utilize any simple or complex arrangement of optical elements to form an image at the image plane 16 of any object in the object plane 12. The spatial filter 20 comprises a single substrate with a nominally flat surface 22 (as best seen in FIG. 4) on one side and a concentric radial optical path profile defined by an axisymmetric conical structure 24 on the other, wherein the apex 25 of the conical structure is preferably rounded or covered to eliminate scattering.

The conical structure 24 refracts and separates the light incident along any diameter of the element 20 into two angularly deviated beams. The combination of the deviated light from all diameters of the element 20 therefore forms a hollow circular point spread function 26 in the image plane 16. The cone angle of the structure 24 is selected to define the radius of the circular point spread function 26 and, as a result, the two dimensional spatial frequency transfer function of the optical subsystem 14.

The spatial filter 20 is preferably placed in a position within the imaging system 10 such that the light from every point in the object plane 12 passes symmetrically through the center of the spatial filter. Otherwise, the point spread function of the system 10 will vary with location in the image plane and will therefore cause a non-uniform modification effect throughout the image. One having ordinary skill in the art will readily appreciate that for a totally axisymmetric imaging system, the location of the spatial filter 20 is determined by the intersection of a chief ray with the optical axis of the system. However, some electronic projection systems employ an imaging system axis decentered from the axis of the optical subsystem, in which case further analysis of the light rays coming from the object plane is required to determine the correct longitudinal and transverse placement of the spatial filter.

Figure 2:
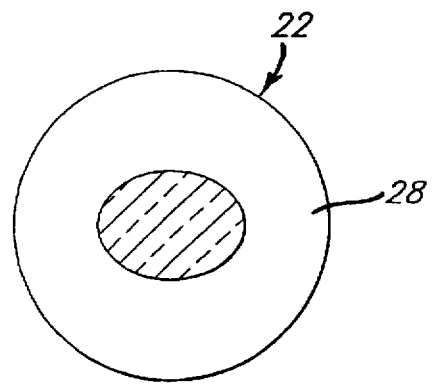
FIG. 2 is a cross-sectional view taken parallel to the base of a second elliptical/conical spatial filter embodiment in accordance with the present invention.
Figure 3A:
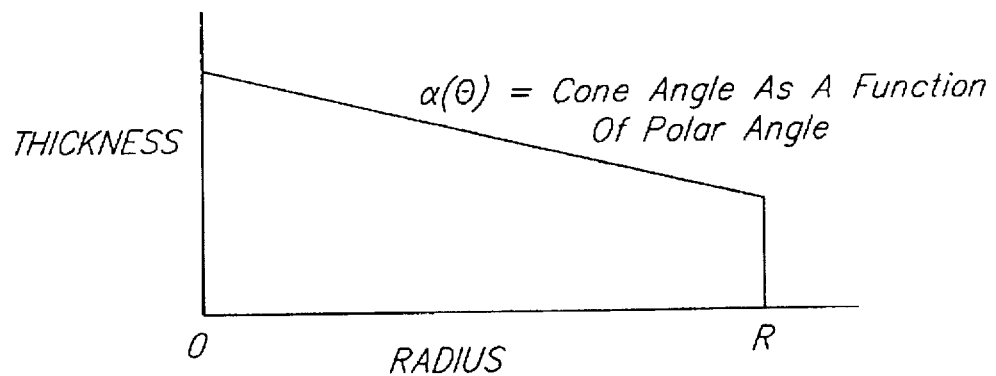
FIGS. 3(a) and (b) are graphs illustrating the variation of the cone angle of the spatial filter shown in FIG. 2.
Figure 3B:
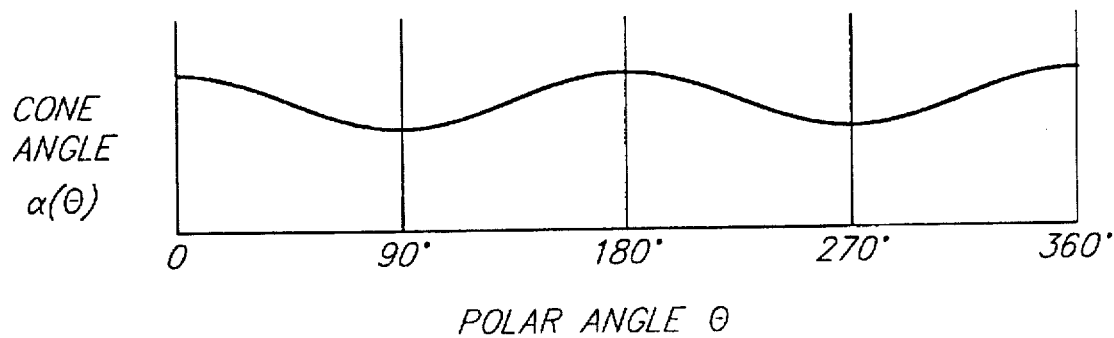

As shown in FIGS. 2, 3(a), and 3(b), a second embodiment of the conical spatial filter of the present invention comprises a concentric radial optical path profile defined by an elliptical/conical outer surface profile/structure 28 on one surface of the base element 20 having a cone angle which varies with the polar angle about the axis of the element. In order to emphasize and illustrate the elliptical/conical profile, FIG. 2 has been drawn to show an elevated cross-section taken parallel to the base element 20. As with the previous embodiment, one can readily appreciate that the cone angle function of polar angle is directly representative of the geometric point spread function produced by the spatial filter. If the cone angle is constant regardless of polar angle, as shown in FIG. 1, the cone angle function is a circle in polar coordinates and the geometric point spread function is also circular. If the cone angle function is elliptical as exemplified in FIGS. 2–3, the point spread function of the spatial filter will also be elliptical.

Note that the aforementioned conical structures can either be convex or concave such that the apex of the cone is either protruding or recessed from the rim of the element. While the performance difference of these two modes is slight, one mode may be advantageous over the other in particular applications due to the way light converges to a focus from each side of the element. In the convex mode, the light from each side of a diameter of the element will cross the optical axis before coming into focus, resulting in a longer effective depth of focus for the entire imaging system. In the concave mode, this crossing does not occur, allowing more of a conventional depth of focus condition.

A third embodiment of the spatial filter of the present invention comprises a radial optical path profile defined by a concentric ring structure 30 forming a radial prism profile of alternating angled steps or cone segments as particularly shown in cross-section in FIG. 4. As with the simple conical embodiment of FIG. 1, the structure 30 refracts and separates the light incident along any diameter of the spatial filter into two angularly deviated beams. The alternating step angle function of polar angle associated with the concentric ring structure 30 is selected just as with the conical function, where in the present embodiment the alternating step angle is equal to the cone angle of the previous embodiment. While the above arrangement represents a preferred embodiment, the concentric ring structure 30 may comprise other suitable arrangements for radially modifying the point spread function as may readily occur to one skilled in the art of spatial filtering, including, but not limited to radial optical path differences based on refractive or gradient index profiles as well as diffractive or holographic structures.

Note further that in all the above cases, if the spatial filter is implemented as an additional element to a existing optical subsystem, the opposite side of the base element 20 may be designed to reduce conventional optical aberrations induced by the thickness of the element 20.

The above embodiments share four common and important advantages over conventional spatially filtered imaging systems. First, the point spread function of the imaging system can be modified continuously in all directions instead of in only a few discrete directions. Accordingly, the amount of modification can be better tuned to avoid over- and under-filtering, resulting in a more uniform modification of the image with reduced blur. Second, in each case the spatial filter can be manufactured with much greater precision because the process is continuous and the tool never leaves the surface of the element, resulting in better control and therefore performance. Third, since each embodiment can be produced with a single-point diamond turning machine versus a linear ruling engine, the surface of the spatial filter will exhibit far fewer manufacturing defects and will therefore provide improved contrast and sharpness in the image. Fourth, since each embodiment can be made using a diamond turning machine, the structure may be integrated into an existing lens of the optical subsystem, including such lenses employing a Fresnel structure. Once the sag of the lens is calculated in accordance with conventional optical design practices, the sag of the desired filter structure can simply be added to the lens sag to determine the combined surface prescription.

The conical structure represents a preferred embodiment of the present invention due to the absence of the ring structure of the concentric ring embodiment. More specifically, the surface is entirely smooth, eliminating all potential gross scattering sources. Further, the relatively simple surface may accommodate, with some modification, traditional machine grinding and polishing practices, even with an elliptical or potentially more complex cone angle function. Accordingly, machines may be fabricated to directly and inexpensively form spatial filters out of a variety of high quality optical materials.

Notwithstanding the above-noted benefits of the conical filter structure, there are two distinct advantages of the concentric ring spatial filter structure over the smooth conical structure. First, the plurality of fine rings in a concentric structure provides a nominal flatness to the element to minimize defects which may occur during compression molding fabrication techniques. Second, the multiple ring structure with alternating step angle is less sensitive to precise positioning in the imaging system. For example, if the light from an objection point passes through only one side of the concentric ring structure 30 to form an image, the several rings will cause at least complete image modification in a radial direction with significantly less modification in the tangential direction. If such light passes through only one side of the conical filter, radial filtering is substantially reduced.

Note finally that the above embodiments may be formed on a reflective surface using the same principles described above and accounting for the differences in reflection versus refraction. While the color dependence of the above refraction-based spatial filters is small, there is no color dependence with a reflection-based element.

The embodiments therefore describe an optical subsystem for an electronic imaging system which provides increased performance over conventional spatial filtering methods in modifying structures in an image. Such modification may therefore be applied to conventional applications of spatial filtering including, but not limited to, reduction of aliasing and improvement of color performance in electronic cameras, the removal of unwanted structures in electronic projection images and the subsequent reduction of moiré patterns when such images are projected onto Fresnel types of projection screens, and other more general applications requiring modification of the system point spread function which may occur to one having ordinary skill in the art.

In addition, the spatial filter embodiments of the present invention further provide a method by which an imaging system can be designed to generate a hollow, closed path point spread function to remove the unwanted artificial structures in the optically formed image. The step of generating the hollow, closed path point spread function is realized by including in the overall imaging system a spatial filter designed in accordance with the teachings of the present invention. The aspect of a closed path point spread function in the present invention results in two important benefits. First, an optical filter designed to provide this point spread function naturally comprises a radial structure which is substantially continuous about a physical or manufacturing center of the filter. This continuity supports minimum manufacturing defects and scattering artifacts in the filter to provide improved image quality. Second, a closed path point spread function provides better fidelity due to improved flexibility and control in modifying image structures when compared to conventionally modified imaging systems by allowing such modification continually in all radial directions in the point spread function. While the present invention describes the use of an elliptical and, in particular, a circular point spread function, such modes are presented to facilitate economical manufacture of a spatial filter providing such functions. One having ordinary skill in the art will therefore appreciate that modifications can be made to produce more complicated and more angularly optimized closed path point spread functions at the cost of potentially greater complexity.

It will be understood that the foregoing description of the preferred embodiments of the present invention is for illustrative purposes only, and that the various structural and operational features herein disclosed are susceptible to a number of modifications, none of which departs from the spirit and scope of the present invention as defined in the appended claims.

I claim:

1. A spatial filter comprising:
   a base optical substrate; and
   a filtering structure integrally formed on said substrate, wherein said filtering structure comprises a radial optical path difference profile which is concentric about an axis of said filter, and is arranged to produce a predetermined point spread function, and wherein said profile comprises a cone angle which varies with the polar angle about an axis of said base substrate.

2. The filter of claim 1 wherein said profile is symmetric about said filter axis.

3. The filter of claim 1 wherein said base substrate comprises a lens.

4. The filter of claim 1 wherein said cone angle varies to produce an elliptical point spread function.

5. The filter of claim 1 wherein said radial optical path difference profile produces said predetermined point spread function based on differences in index of refraction.

6. The filter of claim 1 wherein said base substrate comprises a Fresnel structure.

7. The filter of claim 1 wherein said radial optical path difference profile comprises a plurality of concentric and linear segments forming alternating light path modifying angles relative to said filter axis.

8. The filter of claim 1 wherein said point spread function comprises a hollow, closed path.

9. The filter of claim 8 wherein said hollow, closed path is elliptical.

10. An optical system comprising:
    a lens positioned between an object plane and an image plane for forming an image in the image plane of an object in the object plane; and
    a spatial filter positioned between said lens and said image plane for removing unwanted image structures from said image by modifying the point spread function of said system, said spatial filter comprising a base optical substrate and a filtering structure integrally formed thereon, said filtering structure comprising a varying radial optical path difference profile which is concentric about an axis of said filter, and is arranged to produce said point spread function, wherein said profile comprises a cone angle which varies with the polar angle about an axis of said base substrate.

11. The system of claim 10 wherein said base optical substrate comprises said lens.

12. The system of claim 10 wherein said point spread function comprises a hollow, closed path.

13. The system of claim 12 wherein said hollow, closed path is elliptical.

14. The system of claim 10 wherein said spatial filter is longitudinally placed Proximate a crossing of the optical axis of said system with a chief ray of said system.

15. The system of claim 10 wherein said optical axis of said spatial filter is laterally placed proximate the substantially symmetric and substantially common center of the light bundle from said object plane which passes through said lens.

16. The system of claim 10 wherein said cone angle varies to produce an elliptical point spread function.

17. The system of claim 10 wherein said radial optical path difference profile comprises a plurality of concentric and linear segments forming alternating light path modifying angles relative to said filter axis.

* * * * *